(12) United States Patent
Graumann

(10) Patent No.: US 9,517,776 B2
(45) Date of Patent: Dec. 13, 2016

(54) SYSTEMS, METHODS, AND APPARATUS FOR CONTROLLING DEVICES BASED ON A DETECTED GAZE

(75) Inventor: David L. Graumann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,516

(22) PCT Filed: Dec. 29, 2011

(86) PCT No.: PCT/US2011/067814
§ 371 (c)(1),
(2), (4) Date: Apr. 25, 2014

(87) PCT Pub. No.: WO2013/101044
PCT Pub. Date: Jul. 4, 2013

(65) Prior Publication Data
US 2014/0348389 A1 Nov. 27, 2014

(51) Int. Cl.
*B60W 50/10* (2012.01)
*B60K 35/00* (2006.01)
(Continued)

(52) U.S. Cl.
CPC ............ *B60W 50/10* (2013.01); *B60K 28/066* (2013.01); *B60K 35/00* (2013.01); *B60W 50/08* (2013.01);
(Continued)

(58) Field of Classification Search
None
See application file for complete search history.

(56) References Cited

U.S. PATENT DOCUMENTS 5,289,321 A * 2/1994 Secor .................... B60K 35/00
348/118
5,956,181 A * 9/1999 Lin .......................... B60R 1/12
359/630

(Continued)

FOREIGN PATENT DOCUMENTS

EP    1 569 823 B1    8/2006
EP    2 390 139 A1    11/2011
(Continued)

OTHER PUBLICATIONS

Gentex Corporation, "Backup Camera Display Evaluation Executive Summary," Published Nov. 3, 2011. Retrieved from http://www.gentex.com/images/Backup_Camera_Display_Evaluation_lr.pdf.*

(Continued)

*Primary Examiner* — Matthew Bella
*Assistant Examiner* — Soo Shin
(74) *Attorney, Agent, or Firm* — Sutherland Asbill & Brennan LLP

(57) ABSTRACT

Certain embodiments of the invention may include systems, methods, and apparatus for controlling devices based on a detected gaze. According to an example embodiment of the invention, a method is provided for executing computer executable instructions by one or more processors for controlling one or more devices attached to a vehicle based at least in part on a detected direction of observation of an occupant of the vehicle, the method further includes receiving one or more images from at least one camera attached to the vehicle; locating, from the one or more images, one or more body features associated with the occupant; determining a direction of gaze from the one or more located body features; and controlling the one or more devices based at least in part on the direction of gaze.

34 Claims, 5 Drawing Sheets

(51) Int. Cl.
*B60W 50/08* (2012.01)
*B60K 28/06* (2006.01)
*G06K 9/00* (2006.01)
*G06F 3/01* (2006.01)

(52) U.S. Cl.
CPC ............... *G06F 3/012* (2013.01); *G06F 3/013* (2013.01); *G06K 9/00845* (2013.01); *B60W 2420/42* (2013.01); *B60W 2540/00* (2013.01); *B60W 2540/02* (2013.01); *B60W 2540/22* (2013.01)

(56) References Cited

U.S. PATENT DOCUMENTS

| | | | | |
|---|---|---|---|---|
| 7,199,767 | B2* | 4/2007 | Spero | G02B 5/20 250/203.4 |
| 7,508,979 | B2* | 3/2009 | Comaniciu | G06K 9/00248 382/103 |
| 2004/0066376 | A1* | 4/2004 | Donath | B60R 1/00 345/169 |
| 2005/0149251 | A1* | 7/2005 | Donath | G01C 21/26 701/532 |
| 2008/0065291 | A1* | 3/2008 | Breed | B60N 2/002 701/36 |
| 2008/0069403 | A1* | 3/2008 | Breed | B60K 28/066 382/104 |
| 2009/0015736 | A1* | 1/2009 | Weller | B60R 1/12 349/11 |
| 2009/0290369 | A1* | 11/2009 | Schofield | B60C 23/00 362/494 |
| 2010/0321758 | A1* | 12/2010 | Bugno | B60R 1/088 359/267 |
| 2011/0109746 | A1* | 5/2011 | Schofield | B60R 1/12 348/148 |
| 2012/0093358 | A1* | 4/2012 | Tschirhart | B60R 1/00 382/103 |
| 2013/0038732 | A1* | 2/2013 | Waite | B60R 1/00 348/148 |

FOREIGN PATENT DOCUMENTS

| | | |
|---|---|---|
| JP | 2001-216069 A | 8/2001 |
| WO | 2004/052691 A1 | 6/2004 |
| WO | 2011/155878 A1 | 12/2011 |
| WO | 2013/101044 A1 | 7/2013 |

OTHER PUBLICATIONS

Hamelink (International Patent Publication No. WO 2014/130049).*
International Preliminary Report on Patentability and Written Opinion for PCT Patent Application No. PCT/US2011/067814 mailed on Jul. 10, 2014, 8 pages.
International Search Report and Written Opinion for PCT Application No. PCT/US2011/067814, mailed on Sep. 5, 2012, 11 pages.

* cited by examiner

SYSTEMS, METHODS, AND APPARATUS FOR CONTROLLING DEVICES BASED ON A DETECTED GAZE

FIELD OF THE INVENTION

This invention generally relates to controlling devices in vehicles, and in particular, to detecting a gaze of occupant of the vehicle and controlling the devices based on the detected gaze.

BACKGROUND OF THE INVENTION

It has been estimated that between 25 and 50 percent of all motor vehicle crashes in the United States are caused, at least in part, by driver distractions. Common driver distractions include dialing or talking on a cell phone, sending text messages, reaching for an object inside the vehicle, looking at an object or event outside of the vehicle, or looking away from the road to read displays, books or maps.

Many objects or situations associated with a moving vehicle can be detected when the driver concentrates on the road ahead while intermittently glancing at side- and rear-view mirrors. However, when a driver looks down or to the side for more than just a brief moment, the resulting blind spots or limited peripheral vision can create safety issues for the driver, passengers, and surrounding pedestrians and motorists.

BRIEF DESCRIPTION OF THE FIGURES

Reference will now be made to the accompanying figures and flow diagrams, which are not necessarily drawn to scale, and wherein.

DETAILED DESCRIPTION

Figure 1:
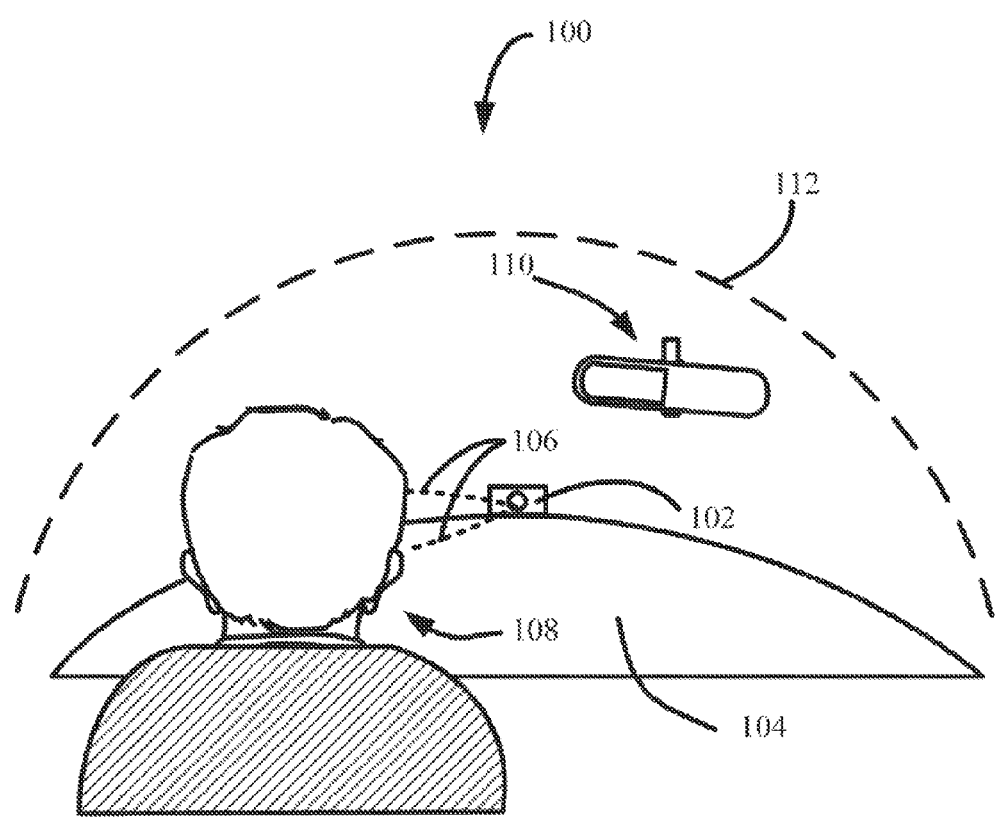
FIG. 1 depicts an illustrative gaze detection arrangement inside a vehicle, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the term vehicle can include a passenger car, a truck, a bus, a freight train, a semi-trailer, an aircraft, a boat, a motorcycle, or any other motorized vehicle that can be used for transportation. As used herein, unless otherwise specified, the use of the term occupant can include a driver or passenger in a vehicle. As used herein, unless otherwise specified, the use of the term gaze can mean a direction in which an occupant is looking or a predominant direction of the occupant's visual attention.

Certain embodiments of the invention may enable control of devices based on a sensed gaze. For example, a camera may be used in a motor vehicle to sense or detect where a driver is looking, gazing, glancing, etc. According to an example embodiment, one or more functions related to devices associated with the motor vehicle may be triggered or controlled by the sensed gaze. According to example embodiments of the invention, devices that may be controlled by the gaze include vehicle displays, sound systems, navigation systems, collision avoidance systems, alerting systems, braking systems, or any other control related to a motor vehicle.

Example embodiments may sense a gaze and use the gaze information to replace actions that may otherwise require an additional movement or interaction. For example instead of reaching out to adjust a control or touch a button, a driver may simply look at a portion of the vehicle to trigger a function. According to example embodiments, gaze trigger regions may be setup spatially within the vehicle cabin so that, for example, at least an awareness of the road ahead can be maintained in peripheral vision.

According to an example embodiment of the invention, a vehicle may include one or more displays for providing information to the driver and/or passengers of a vehicle. The one or more displays may include head-up displays, rear-view mirror displays, and/or console displays. According to example embodiments, a detected gaze may be utilized for altering visibility, focus, contrast, brightness, text size, information, and/or color associated with the display. According to an example embodiment, one or more light sensors may be utilized to determine, for example, ambient lighting conditions in a vehicle cabin and/or lighting conditions on an occupant's face. In accordance with example embodiments, the one or more light sensors may be utilized for adjusting a display's target brightness based on one or more of the ambient light conditions, the lighting conditions on the occupants' face, or the detected gaze.

Various systems may be utilized for detecting a gaze and controlling devices, according to example embodiments of the invention, and will now be described with reference to the accompanying figures.

FIG. 1 depicts an illustrative gaze detection arrangement 100 inside a vehicle, according to an example embodiment. In accordance with an example embodiment, a camera 102 may be mounted to (or imbedded in) the vehicle. For example, the camera 102 may be attached to vehicle console 104. According to an example embodiment, the camera 102 may have a field-of-view 106 that includes at least a head portion of a vehicle occupant 108. In an example embodiment, the camera 102 may be configured to capture images of the occupant 108, and the images may be processed to determine one or more facial, head, torso features and/or lighting conditions associated with the vehicle or occupant 108. According to an example embodiment, and for illustration purposes, FIG. 1 depicts an example rear-view mirror 110 attached to the vehicle. According to an example embodiment, the occupant 108 may gaze at the rear-view-mirror 110 without adversely changing his or her peripheral vision 112, for example, so that awareness of surroundings is not unnecessarily compromised.

Figure 2:
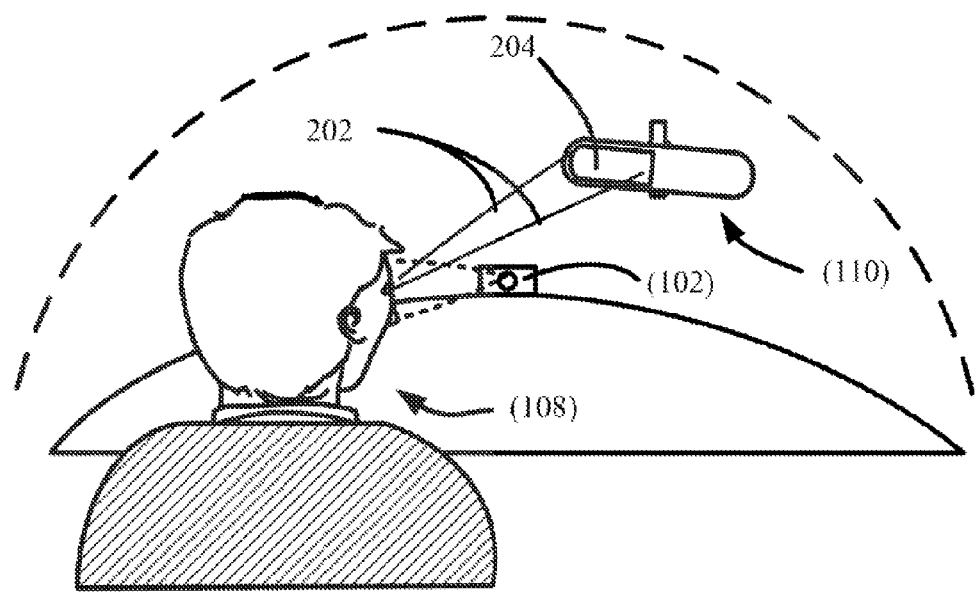
FIG. 2 shows the illustrative gaze detection arrangement of FIG. 1, with an occupant gazing at a first region associated with a vehicle, according to an example embodiment of the invention.

Another view of the illustrative gaze detection arrangement 100 of FIG. 1 is depicted in FIG. 2, but with the occupant (for example, the occupant 108 of FIG. 1) looking at a first portion 204 associated with a vehicle. According to an example embodiment of the invention, the camera (for example, the camera 102 of FIG. 1) and associated processing system may be configured to detect the gaze 202, and based on the detected gaze 202, may provide certain commands or controls. For example, a gaze 202 may be detected that is directed to a first portion 204 of a rear-view-mirror (for example, the rear-view-mirror 110 of FIG. 1). According to an example embodiment, the said first portion 204 may include a display, and the detected gaze 202 may be utilized for altering visibility, focus, contrast, brightness, text size, information, and/or color associated with the display.

Figure 3:
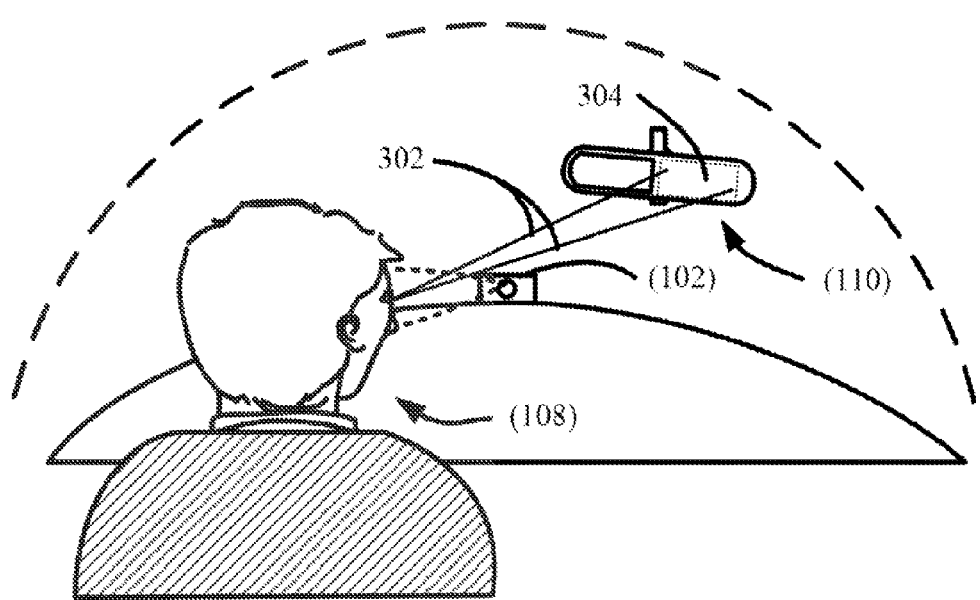
FIG. 3 shows the illustrative gaze detection arrangement of FIG. 1 or 2, with the occupant gazing at a second region associated with the vehicle, according to an example embodiment of the invention.

Another view of the illustrative gaze detection arrangement 100 of FIG. 1 is depicted in FIG. 3, with the occupant (for example, the occupant 108 of FIG. 1) looking a second portion 304 associated with the vehicle. According to an example embodiment of the invention, the camera (for example, the camera 102 of FIG. 1) and an associated processing system, may be configured to detect the gaze 302, and based on the detected gaze 302, may provide certain commands or controls. For example, a gaze 302 may be detected that is directed to a second portion 304 of a rear-view-mirror (for example, the rear-view-mirror 110 of FIG. 1). According to an example embodiment, the said second portion 304 may include a different display (or just a mirror in this example) and the detected gaze 302 may be interpreted and utilized for altering visibility, focus, contrast, brightness, text size, information, and/or color associated with the other displays associated with the vehicle. For example, if the second portion 304 includes only a rear-view-mirror, and if the detected gaze 302 is determined to be directed to the second portion 304, then any configuration of information that may be associated with a first portion (for example, the first portion 204 in FIG. 2) may be altered to reduce distraction from the purpose of the second portion 304).

According to example embodiments, similar arrangements as those described above with reference to FIGS. 1-3 may utilize a camera to detect gazing or gestures of an occupant, and may use the detected gaze to alter or control some aspect associated with the vehicle. Displays for example, do not need to be limited to the rear-view mirror, and may include any number of head-up displays and/or console displays.

Figure 4:
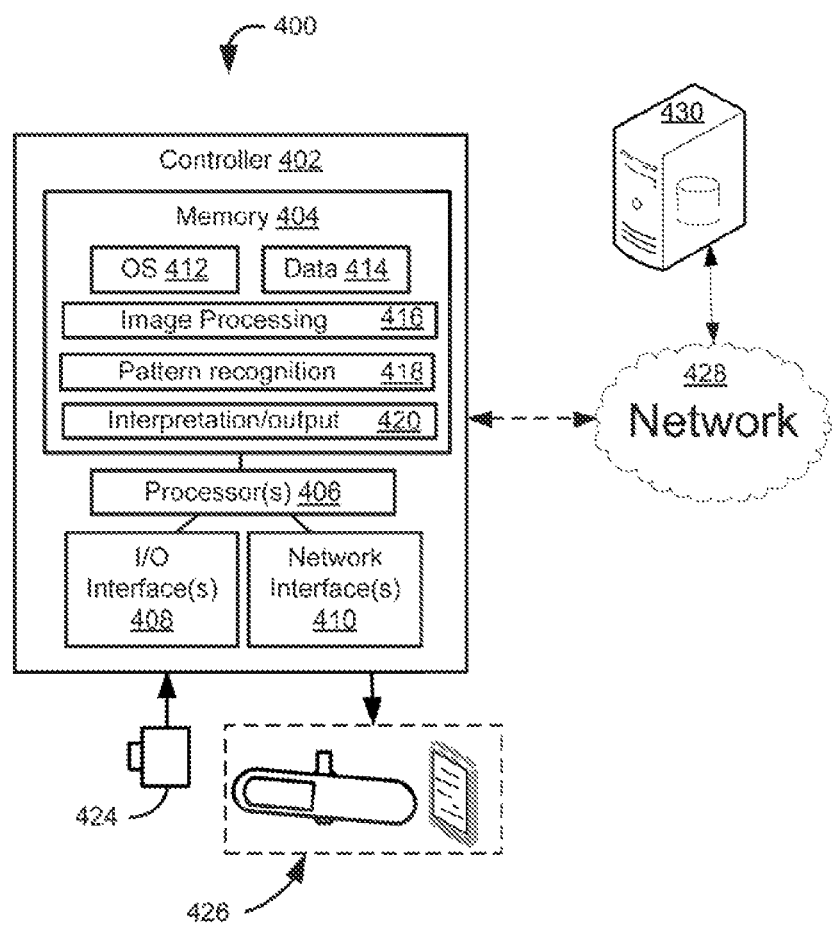
FIG. 4 is a block diagram of an illustrative gaze detection system, according to an example embodiment of the invention.

FIG. 4 is a block diagram of an illustrative gaze detection system 400, according to an example embodiment of the invention. The system may include a controller 402 that is in communication with one or more cameras 424. Images from the one or more cameras 424 may be processed by the controller 402 and used to control or alter devices 426 associated with the vehicle. According to an example embodiment, the controller 402 includes a memory 404 in communication with one or more processors 406. The one or more processors may communicate with the camera 424 and/or the devices 426 via one or more input/output interfaces 408. According to an example embodiment, the memory 404 may include one or more modules that provide computer readable code for configuring the processor to perform certain special functions. For example, the memory may include an image-processing module 416. According to an example embodiment, the memory may include a pattern recognition module 418. The pattern recognition module 418, for example, may work in conjunction with the image-processing module 416, and may be utilized for locating and tracking features in the captured and processed images. In an example embodiment, the pattern recognition module 418 may be utilized for determining a gaze of a vehicle occupant based on the captured images. For example, an image may include a head, ears, eyes, and other features. The relative attitude, rotation, or tilt of the head may be determined and the gaze may be determined by a further analysis of the eye positions, according to an example embodiment.

In accordance with an example embodiment, the memory may include an interpretation/output module 420 that may provide commands or other information to the devices 426 based at least on the determination of the gaze. In example embodiments, commands or other information may include visibility, focus, contrast, brightness, text size, and/or color associated with the display and may be determined, at least in part, with the interpretation/output module 420.

According to an example embodiment, the controller may include one or more network interfaces 410 for providing communications between the controller and a remote server 430 via a wireless network 428. According to example embodiments, the remote server 430 may be used for gathering information, and/or for providing software or firmware updates to the controller 402 as needed.

Figure 5:
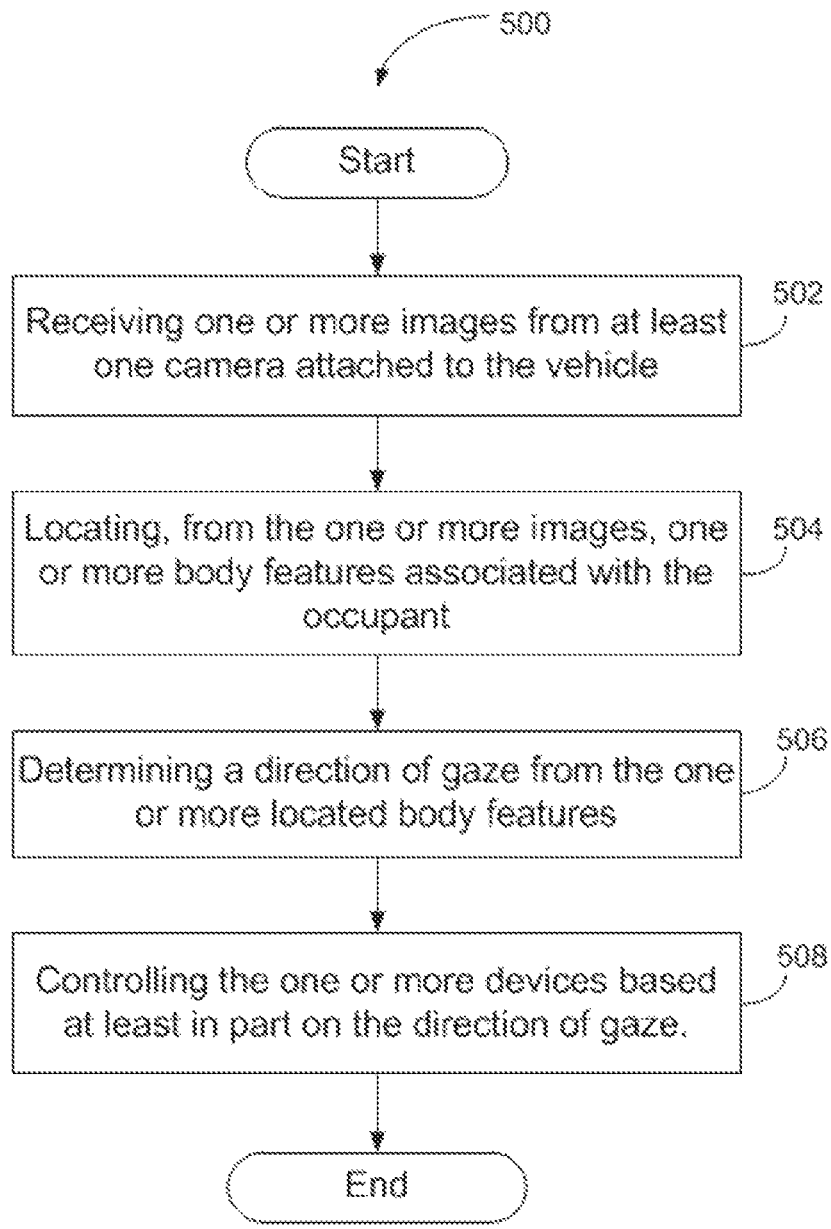
FIG. 5 is a flow diagram of an example method according to an example embodiment of the invention.

An example method 500 for controlling one or more devices attached to a vehicle based at least in part on a detected direction of observation of an occupant of the vehicle will now be described with reference to the flow diagram of FIG. 5. The method 500 starts in block 502, and according to an example embodiment of the invention includes receiving one or more images from at least one camera attached to the vehicle. In block 504, the method 500 includes locating, from the one or more images, one or more body features associated with the occupant. In block 506, the method 500 includes determining a direction of gaze from the one or more located body features. In block 508, the method 500 includes controlling the one or more devices based at least in part on the direction of gaze. The method 500 ends after block 508.

According to an example embodiment, locating of the one or more body features comprises locating at least a head associated with the occupant. In an example embodiment, locating of the one or more body features comprises locating one or more eyes associated with the occupant. According to an example embodiment, the method can further include determining a gesture of the occupant from the one or more body features and controlling the one or more devices based at least in part on the gesture. According to an example embodiment, the gesture can include one or more of a hand movement or a voice command. According to an example embodiment, controlling the one or more devices includes one or more of adjusting a brightness or contrast of at least a portion of a display, actuating a motor, adjusting a control setting, or prompting the occupant with audible or visual information. According to an example embodiment, determining the direction of gaze includes tracking the occupant's head attitude duration and stability.

According to example embodiments, certain technical effects can be provided, such as creating certain systems, methods, and apparatus that detect a gaze of a vehicle occupant and provide information for controlling one more devices in the vehicle. Example embodiments of the invention can provide the further technical effects of providing systems, methods, and apparatus for providing information to a driver without requiring the driver to look away from the road.

In example embodiments of the invention, the gaze detection system 400 may include any number of hardware and/or software applications that are executed to facilitate any of the operations. In example embodiments, one or more input/output interfaces may facilitate communication between the gaze detection system 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the gaze detection system 400. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the gaze detection system 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the gaze detection system 400 with more or less of the components illustrated in FIG. 4.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based, computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising executing computer executable instructions by one or more processors for controlling at least a first device and a second device attached to a vehicle based at least in part on a detected direction of observation of an occupant of the vehicle, the method further comprising:
   receiving one or more images from at least one camera attached to the vehicle, the vehicle including an object comprising a first portion associated with the first device and a second portion associated with the second device;
   locating, from the one or more images, one or more body features associated with the occupant;

determining a direction of gaze towards the object using the one or more located body features; and controlling a first output of the first device associated with the first portion and controlling a second output of the second device associated with the second portion, based on the determined direction of gaze being towards the first portion, wherein controlling the second output of the second device comprises altering the second output.

2. The method of claim 1, wherein the locating of the one or more body features comprises locating at least a head associated with the occupant.

3. The method of claim 1, wherein the locating of the one or more body features comprises locating one or more eyes associated with the occupant.

4. The method of claim 1, further comprising determining a gesture of the occupant from the one or more body features and controlling at least one of the first device and the second device based at least in part on the gesture.

5. The method of claim 4, wherein the gesture comprises one or more of a hand movement or a voice command.

6. The method of claim 1, wherein altering the second output comprises one or more of adjusting a brightness or contrast of at least a portion of a display, actuating a motor, adjusting a control setting, or prompting the occupant with audible or visual information.

7. The method of claim 1, wherein determining the direction of gaze comprises tracking the occupant's head attitude duration and stability.

8. The method of claim 1, wherein the first device and second device comprise an integrated device.

9. A vehicle comprising:
a first device attached to the vehicle;
a second device attached to the vehicle;
at least one camera attached to the vehicle, the vehicle including an object comprising a first portion associated with the first device and a second portion associated with the second device;
at least one memory for storing data and computer-executable instructions; and
one or more processors configured to access the at least one memory and further configured to execute computer executable instructions for:
receiving one or more images from at least one camera attached to the vehicle;
locating, from the one or more images, one or more body features associated with an occupant of the vehicle;
determining a direction of gaze towards the object using the one or more located body features; and
controlling a first output of the first device associated with the first portion and controlling a second output of the second device associated with the second portion, based on the determined direction of gaze being towards the first portion, wherein controlling the second output of the second device comprises altering the second output.

10. The vehicle of claim 9, wherein the locating of the one or more body features comprises locating at least a head associated with the occupant.

11. The vehicle of claim 9, wherein the locating of the one or more body features comprises locating one or more eyes associated with the occupant.

12. The vehicle of claim 9, wherein the one or more processors are further configured for determining a gesture of the occupant from the one or more body features and controlling at least one of the first device and the second device based at least in part on the gesture.

13. The vehicle of claim 12, wherein the gesture comprises one or more of a hand movement or a voice command.

14. The vehicle of claim 9, wherein altering the second output comprises one or more of adjusting a brightness or contrast of at least a portion of a display, actuating a motor, adjusting a control setting, or prompting the occupant with audible or visual information.

15. The vehicle of claim 9, wherein determining the direction of gaze comprises tracking the occupant's head attitude duration and stability.

16. The vehicle of claim 9, wherein the at least one of the first device and the second device comprises one or more of a video screen, a mirror with an integrated display, a stereo system, a sun roof, a car window, a lock, a car seat, a climate control system, or a dashboard console.

17. The vehicle of claim 9, wherein the first device and the second device comprise an integrated device.

18. An apparatus comprising:
at least one memory for storing data and computer-executable instructions; and
one or more processors configured to access the at least one memory and further configured to execute computer executable instructions for:
receiving one or more images from at least one camera attached to the vehicle, the vehicle including an object comprising a first portion associated with a first device and a second portion associated with a second device;
locating, from the one or more images, one or more body features associated with an occupant of the vehicle;
determining a direction of gaze towards the object using the one or more located body features; and
controlling a first output of the first device associated with the first portion and controlling a second output of the second device associated with the second portion, based on the determined direction of gaze being towards the first portion, wherein controlling the second output of the second device comprises altering the second output.

19. The apparatus of claim 18, wherein the locating of the one or more body features comprises locating at least a head associated with the occupant.

20. The apparatus of claim 18, wherein the locating of the one or more body features comprises locating one or more eyes associated with the occupant.

21. The apparatus of claim 18, wherein the one or more processors are further configured for determining a gesture of the occupant from the one or more body features and controlling at least one of the first device and the second device based at least in part on the gesture.

22. The apparatus of claim 21, wherein the gesture comprises one or more of a hand movement or a voice command.

23. The apparatus of claim 18, wherein altering the second output comprises one or more of adjusting a brightness or contrast of at least a portion of a display, actuating a motor, adjusting a control setting, or prompting the occupant with audible or visual information.

24. The apparatus of claim 18, wherein determining the direction of gaze comprises tracking the occupant's head attitude duration and stability.

25. The apparatus of claim 18, wherein at least one of the first device and the second device comprises one or more of a video screen, a mirror with an integrated display, a stereo system, a sun roof, a car window, a lock, a car seat, a climate control system, or a dashboard console.

26. The apparatus of claim 18, wherein the first device and the second device comprise an integrated device.

27. A computer program product, comprising a non-transitory computer-readable medium having a computer readable program code embodied therein, said computer readable program code adapted to be executed to implement a method for controlling at least a first device and a second device attached to a vehicle based at least in part on a detected direction of observation of an occupant of the vehicle, the method further comprising:
   receiving one or more images from at least one camera attached to the vehicle, the vehicle including an object comprising a first portion associated with the first device and a second portion associated with the second device;
   locating, from the one or more images, one or more body features associated with the occupant;
   determining a direction of gaze towards the object using the one or more located body features; and
   controlling a first output of the first device associated with the first portion and controlling a second output of the second device associated with the second portion, based on the determined direction of gaze being towards the first portion, wherein controlling the second output of the second device comprises altering the second output.

28. The computer program product of claim 27, wherein the locating of the one or more body features comprises locating at least a head associated with the occupant.

29. The computer program product of claim 27, wherein the locating of the one or more body features comprises locating one or more eyes associated with the occupant.

30. The computer program product of claim 27, further comprising determining a gesture of the occupant from the one or more body features and controlling at least one of the first device and the second device based at least in part on the gesture.

31. The computer program product of claim 30, wherein the gesture comprises one or more of a hand movement or a voice command.

32. The computer program product of claim 27, wherein altering the second output comprises one or more of adjusting a brightness or contrast of at least a portion of a display, actuating a motor, adjusting a control setting, or prompting the occupant with audible or visual information.

33. The computer program product of claim 27, wherein determining the direction of gaze comprises tracking the occupant's head attitude duration and stability.

34. The computer program product of claim 27, wherein the first device and the second device comprise an integrated device.

* * * * *